US008834585B2

(12) United States Patent
Lin et al.

(10) Patent No.: US 8,834,585 B2
(45) Date of Patent: Sep. 16, 2014

(54) HYDROGEN GENERATING DEVICE

(75) Inventors: Yu-Hsiang Lin, Hsinchu County (TW); Hsuan-Yi Lu, Hsinchu County (TW)

(73) Assignee: Young Green Energy Co., Hsinchu County (TW)

( * ) Notice: Subject to any disclaimer, the term of this patent is extended or adjusted under 35 U.S.C. 154(b) by 685 days.

(21) Appl. No.: 13/187,531

(22) Filed: Jul. 21, 2011

(65) Prior Publication Data
US 2012/0141335 A1 Jun. 7, 2012

(30) Foreign Application Priority Data
Dec. 2, 2010 (CN) .......................... 2010 1 0576404

(51) Int. Cl.
*B01J 7/00* (2006.01)
(52) U.S. Cl.
USPC .............. 48/61; 48/127.9; 423/651; 423/652; 423/653; 423/648.1
(58) Field of Classification Search
USPC ........ 48/61, 127.1, 127.9; 423/651, 652, 653, 423/648.1
See application file for complete search history.

(56) References Cited

U.S. PATENT DOCUMENTS

| | | | | |
|---|---|---|---|---|
| 3,544,382 | A * | 12/1970 | Wandschneider et al. .... | 429/410 |
| 6,544,400 | B2 * | 4/2003 | Hockaday et al. ............ | 205/338 |
| 7,344,571 | B2 * | 3/2008 | Bae et al. ...................... | 48/61 |
| 7,540,892 | B2 * | 6/2009 | Strizki et al. ................. | 48/61 |
| 2001/0045364 | A1 * | 11/2001 | Hockaday et al. ............ | 205/338 |
| 2004/0243184 | A1 | 12/2004 | Johnson et al. | |
| 2005/0266281 | A1 * | 12/2005 | Adams et al. .................. | 429/17 |
| 2006/0174952 | A1 * | 8/2006 | Curello et al. ........... | 137/614.03 |
| 2009/0029209 | A1 | 1/2009 | Wang et al. | |
| 2010/0104481 | A1 * | 4/2010 | Curello et al. ................. | 422/112 |
| 2011/0099904 | A1 * | 5/2011 | Rosenzweig et al. ............. | 48/89 |
| 2012/0141334 | A1 * | 6/2012 | Lu et al. ......................... | 422/211 |
| 2012/0156103 | A1 * | 6/2012 | Lin et al. ........................ | 422/129 |
| 2012/0171083 | A1 * | 7/2012 | Lin et al. ....................... | 422/187 |
| 2012/0251916 | A1 * | 10/2012 | Wu et al. ....................... | 429/480 |
| 2013/0115142 | A1 * | 5/2013 | Chou et al. .................... | 422/162 |

FOREIGN PATENT DOCUMENTS

TW 200640070 11/2006

* cited by examiner

*Primary Examiner* — Kaity V. Handal
(74) *Attorney, Agent, or Firm* — Jianq Chyun IP Office

(57) ABSTRACT

A hydrogen generating device is adapted for a fuel cell. The hydrogen generating device includes a casing, a button, a solid reactant, a bag-shaped body, and at least one flexible element. The casing has a containing space and an opening. The button is integrally formed and connected to the casing to seal the opening. The solid reactant is disposed in the casing. The bag-shaped body is disposed in the casing and contains a liquid reactant. The flexible element is connected to the casing and is located in the containing space. The flexible element includes a bending end, wherein the flexible element is aligned to the button and is located between the button and the bag-shaped body. When the button is pressed, the button pushes the flexible element so the bending end pierces the bag-shaped body, and the liquid reactant flows out and reacts with the solid reactant to generate hydrogen.

11 Claims, 3 Drawing Sheets

HYDROGEN GENERATING DEVICE

CROSS-REFERENCE TO RELATED APPLICATION

This application claims the priority benefit of China application serial no. 201010576404.7, filed on Dec. 2, 2010. The entirety of the above-mentioned patent application is hereby incorporated by reference herein and made a part of this specification.

BACKGROUND OF THE INVENTION

1. Field of the Invention

The invention relates to a hydrogen generating device, and more particularly, to a hydrogen generating device that utilizes a solid reactant.

2. Description of Related Art

Fuel cells are a power generating device that convert chemical energy into electricity. Comparing to conventional power generating devices, fuel cells have the advantages of little pollution, low noise, high energy density, and high energy conversion rates. Fuel cells could be used in fields such as portable electronics, home power generating systems, transportation, military equipment, space industry, and small power generating systems.

Each type of fuel cell is used for different application markets according to each different operating principle and environment. The application of mobile sources mainly uses a proton exchange membrane fuel cell (PEMFC) and a direct methanol fuel cell (DMFC). The two belong to low temperature starting fuel cells that use a proton exchange membrane to transmit protons to the mechanism. In the PEMFC operating principle, hydrogen in the positive pole catalyst layer undergoes an oxidation reaction, generating a hydrogen ion (H+), and an electron (e−) (PEMFC principle), or methanol and water in the positive pole catalyst layer undergoes an oxidation reaction to generate a hydrogen ion (H+), $CO_2$, and an electron (e−) (DMFC principle), wherein the hydrogen ion could transmit to the negative pole through the proton conduction membrane, and the electron is then applied to a load for work through an outer circuit and thereafter transmits to the negative pole through the outer circuit. At this point the oxygen received by the negative electron terminal will undergo a restoring reaction with the hydrogen ion and the electron in the negative pole catalyst layer to generate water. The hydrogen fuel required by the positive pole could be obtained through the reaction between liquid reactants and solid reactants. For example, in the technique of using solid NaBH4 to store hydrogen, water is mixed and reacts with the solid NaBH4 to generate hydrogen.

That is to say, the solid NaBH4 and water bag are disposed in a casing, and the user could press a button disposed on the casing to pierce the water bag, so the water in the water bag flows out and reacts with the solid NaBH4 to generate hydrogen. The disadvantage of this method is the button and the casing are assembled as different structures. Thus when the button is pressed, there is an interstice between the button and the casing so the structure is not airtight, lowering the generation rate of hydrogen. In addition, when piercing the water bag, since the size of the pierced opening is limited, a portion of the water will remain in the water bag because of the obstruction from the water bag, and only a portion of the water will flow out and react with the solid NaBH4, lowering the generation rate of hydrogen.

Taiwan patent application no. TW200640070 and US patent application publication no. US20090029209, US20040243184 discloses technology relating to fuel cells.

SUMMARY OF THE INVENTION

The invention provides a hydrogen generating device with better airtight quality, so as to raise the hydrogen generation rate at which the reaction between the solid reactants and the liquid reactants takes place.

Other objects and advantages of the invention could be further illustrated by the technical features broadly embodied and described as follows.

In order to achieve one or a portion of or all of the objects or other objects, one embodiment of the invention provides a hydrogen generating device, adapted for a fuel cell. The hydrogen generating device includes a casing, a button, a solid reactant, a bag-shaped body, and at least one flexible element. The casing has a containing space and an opening. The button is integrally formed and connected to the casing to seal the opening. The solid reactant is disposed in the casing. The bag-shaped body is disposed in the casing, and contains a liquid reactant. The flexible element is connected to the casing and is located in the containing space. The flexible element includes a bending end, wherein the flexible element is aligned to the button and is located between the button and the bag-shaped body. When the button is pressed, the button pushes the flexible element so the bending end pierces the bag-shaped body, and the liquid reactant flows out and reacts with the solid reactant to generate hydrogen.

In one embodiment of the invention, the button is a thermoplastic elastomer.

In one embodiment of the invention, a material of the casing is a high polymer plastic.

In one embodiment of the invention, the button and the casing are fabricated through a double injection method.

In one embodiment of the invention, the flexible element is a metallic piece.

In one embodiment of the invention, the quantity of the flexible elements is two, and the flexible elements respectively extend from two opposite inner walls of the casing.

In one embodiment of the invention, the bending end includes a sawtooth structure, a pin structure, or a knife structure, and when the button is pressed, the button pushes the bending end towards the bag-shaped body to pierce the bag-shaped body.

In one embodiment of the invention, the casing has an exhaust opening linked to the containing space.

In one embodiment of the invention, the hydrogen generating device further comprises an absorbent enclosing the solid reactant or mixing with the solid reactant.

The hydrogen generating device is characterized so that the solid reactant is solid NaBH4.

In one embodiment of the invention, the bending end extends in a direction towards the bag-shaped body.

Based on the above, in an embodiment of the invention, the button is configured in the casing and seals the opening of the casing through the method of integral formation. Thus, when the button is pressed and the flexible element is pushed to pierce the bag-shaped body, there will be no interstice between the button and the casing, and the entire structure will have a better airtight quality, improving the generation rate of hydrogen. In addition, the flexible element includes a bending end. When the button is pushed, the bending end pierces the bag-shaped body. After the bending end pierces the bag-shaped body, the bending end could continue to be pushed to rip and widen the pierced opening, preventing the liquid reactant from remaining in the bag-shaped body and lowering the generation of hydrogen.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention could be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
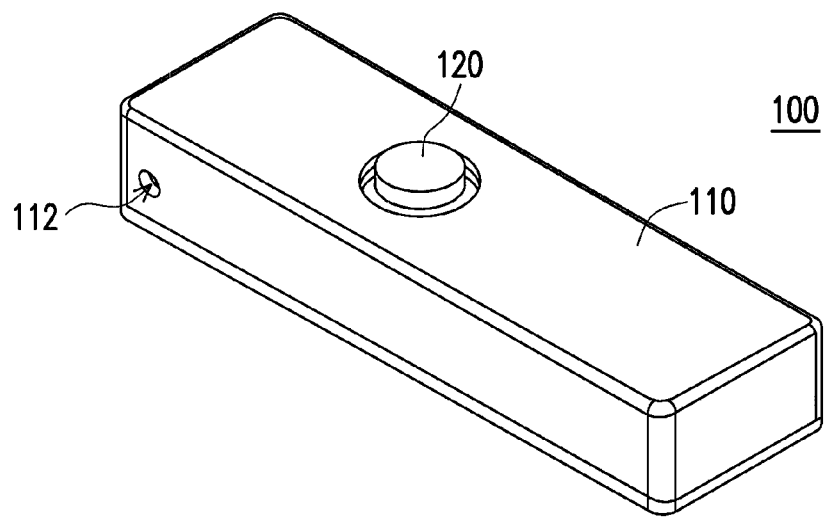
FIG. 1 is a three-dimensional schematic view of a hydrogen generating device according to an embodiment of the invention.
Figure 2:
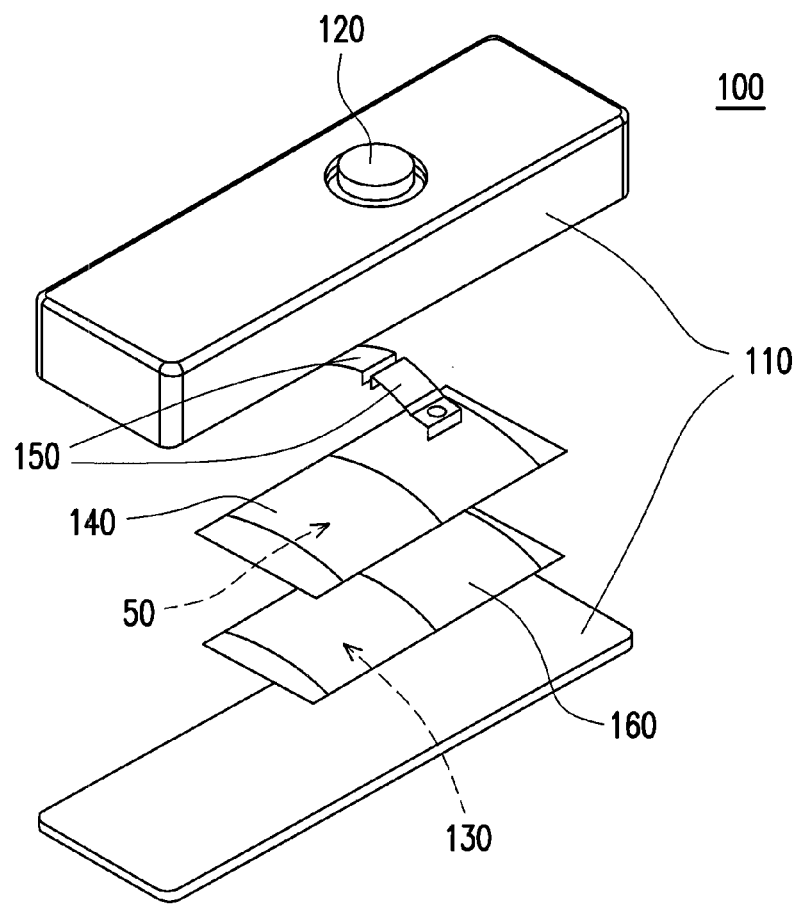
FIG. 2 is an exploded view of the hydrogen generating device in FIG. 1.
Figure 3:
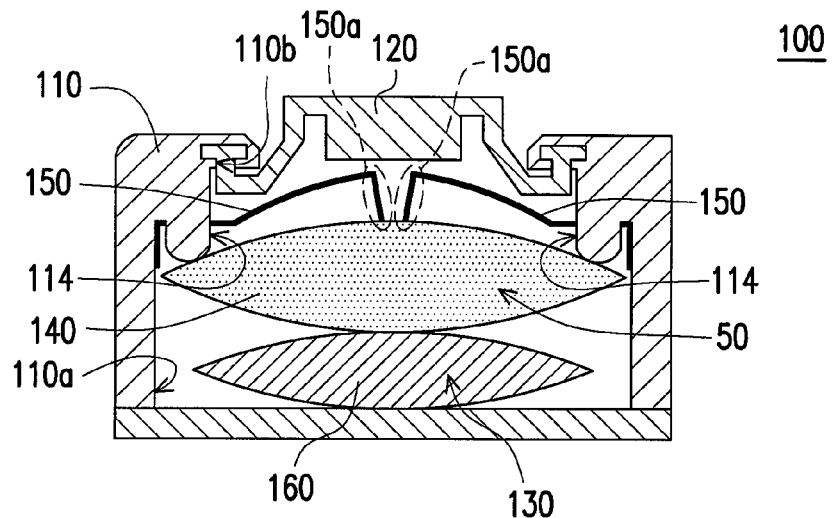
FIG. 3 is a cross-sectional view of the hydrogen generating device in FIG. 1.

FIG. 1 is a three-dimensional schematic view of a hydrogen generating device according to an embodiment of the invention. FIG. 2 is an exploded view of the hydrogen generating device in FIG. 1. FIG. 3 is a cross-sectional view of the hydrogen generating device in FIG. 1. Referring to FIGS. 1 through 3, the hydrogen generating device 100 of the embodiment is, for example, adapted for a fuel cell, used to provide the fuel cell with hydrogen to generate power. The hydrogen generating device 100 includes a casing 110, a button 120, a solid reactant 130, a bag-shaped body 140, and at least one flexible element 150 (the embodiment shows two).

The casing 110 has a containing space 110a and an opening 110b. The button 120 is integrally formed and connected to the casing 110 to seal the opening 110b. The invention does not limit the shape of the opening 110b and the button 120. In other embodiments, the opening 110b and the button 120 could be other suitable shapes used for sealing. The solid reactant 130 and the bag-shaped body 140 are disposed in the casing 110, and the liquid reactant 50 is contained in the bag-shaped body 140. The flexible element 150 is connected to the casing 110 and is located in the containing space 110a. The flexible element 150 includes a bending end 150a (circled by the dotted line), wherein the flexible element 150 is aligned to the button 120 and is located between the button 120 and the bag-shaped body 140. In the embodiment, an end of the flexible element 150 is connected to the inner wall of the casing 110, and the other end is bent towards the bag-shaped body 140 to form a bending end 150a. The bending end 150a is the free end pushed by the button 120. In addition, the solid reactant 130 of the embodiment is, for example, solid NaBH4, and the liquid reactant 50 is, for example, water. However, the invention is not limited thereto. The solid reactant 130 and the liquid reactant 50 could also be other suitable substances that generate hydrogen when reacted together.

Figure 4:
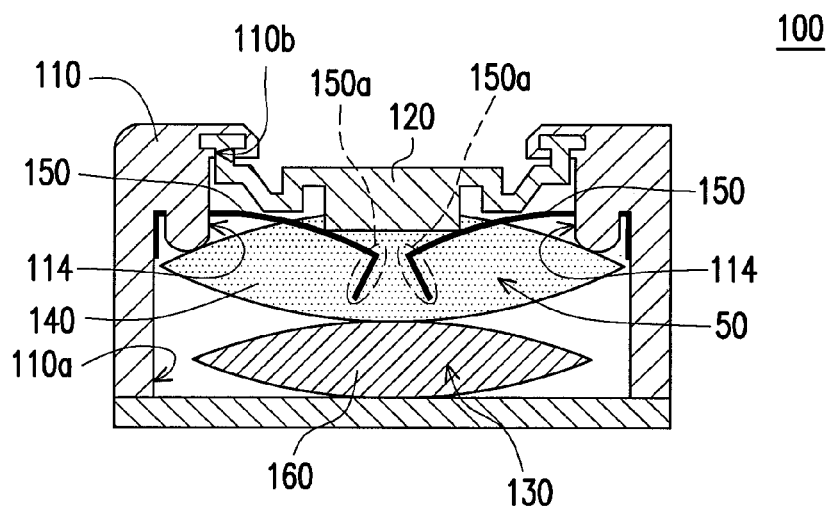
FIG. 4 is a cross-sectional view illustrating the operation of the hydrogen generating device in FIG. 3.

FIG. 4 is a cross-sectional view illustrating the operation of the hydrogen generating device in FIG. 3. The user could press the button 120, and push the flexible element 150 through the button 120 from the position in FIG. 3 to the position in FIG. 4. The bending end 150a then pierces the bag-shaped body 140, so that the liquid reactant 50 in the bag-shaped body 140 flows to the containing space 110a and reacts with the solid reactant 130 to generate hydrogen.

In this configuration, since the button 120 is integrally formed to configure to the casing 110, and seals the opening 110b of the casing 110, when the user presses the button 120 and pushes the flexible element 150 so the bending end 150a moves towards the bag-shaped body 140 and pierces the bag-shaped body 140, there is no interstice between the button 120 and the casing 110. Therefore, the entire structure has a better airtight quality, improving the generation rate of hydrogen.

In detail, the button 120 of the embodiment is, for example, a thermoplastic elastomer (TPE). The material of the casing 110 is high polymer plastic. The button 120 and the casing 110 could be fabricated through a double injection method, so the button 120 and the casing 110 are an integrally formed structure, therefore having a better airtight quality.

Figure 5:
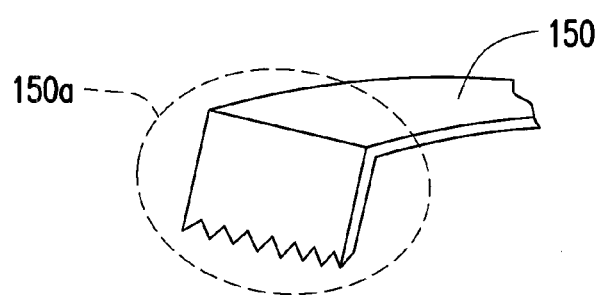
FIG. 5 is a partial schematic view of the flexible element in FIG. 1.

FIG. 5 is a partial schematic view of the flexible element in FIG. 1. Referring to FIG. 5, in the embodiment, the bending end 150a extends in a direction towards the bag-shaped body 140, and the bending end 150a has a sawtooth structure, so that the flexible element 150 is suitable to pierce and rip the bag-shaped body 140 through the sawtooth structure of the bending end 150a. However, the embodiment is not limited to the sawtooth structure. The bending end 150a could be designed with other structures to pierce the bag-shaped body 140, such as a pin structure, a knife structure, a hook structure, or other suitable structures.

Referring to FIG. 1, in the embodiment, the casing 110 has an exhaust opening 112, and the exhaust opening 112 is linked to the containing space 110a (referenced in FIG. 3). By this way, the hydrogen generated by the reaction between the solid reactant 130 and the liquid reactant 50 could exit through the exhaust opening 112 to be used by the fuel cell.

The hydrogen generating device 100 of the embodiment includes an absorbent 160. The absorbent 160 encloses the solid reactant 130. When the bag-shaped body 140 is pierced by the bending end 150a of the flexible element 150 so that the liquid reactant 50 flows to the containing space 110a, the liquid reactant 50 will be absorbed by the absorbent 160 and then reacts with the solid reactant 130 to generate hydrogen. However, the invention is not limited thereto. In other embodiments, the absorbent 160 could include a plurality of absorbent particles and be mixed with the solid reactant 130.

Figure 6A:
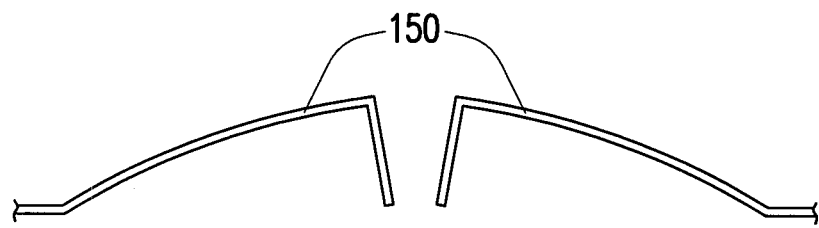
FIGS. 6A to 6C are schematic views illustrating the operation of the flexible element in FIG. 3.
Figure 6B:
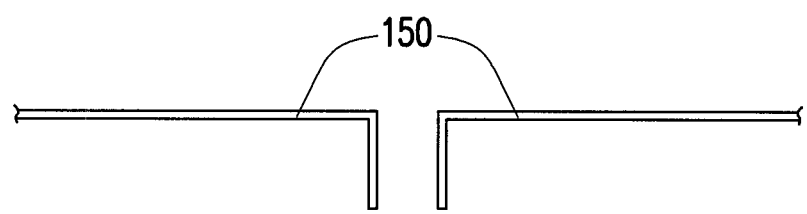
Figure 6C:
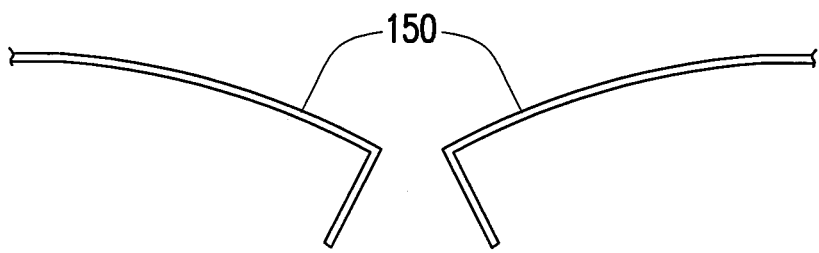

A detailed description of the operation of the flexible element 150 is provided below with the accompaniment of figures. FIGS. 6A to 6C are schematic views illustrating the operation of the flexible element in FIG. 3. Referring to FIG. 3 and FIG. 6A, the flexible element 150 of the embodiment could be a metallic piece, and two flexible elements 150 respectively extend from the opposite inner walls 114 of the casing 110. When the user presses the button 120, the user resists the elasticity of the flexible element 150 to push the flexible element 150 from the position in FIG. 6A to the position in FIG. 6B. When the flexible element 150 is in the position of FIG. 6B, if the user continues to push the flexible element 150 by pushing the button 120, the flexible element 150 will bend from the position in FIG. 6B to the position in FIG. 6C, and the bending end 150a is bent towards the bag-shaped body 140 to pierce the bag-shaped body 140. In addition, it should be noted that when the flexible element 150 changes from the state in FIG. 6B to the state in FIG. 6C, since the two flexible elements 150 extend from the inner walls of the casing 110, the ends of the two flexible elements 150 that respectively extend from the inner walls of the casing 110 act as a pivot, and the two flexible elements 150 move towards the bag-shaped body 140 in a clockwise and counterclockwise direction. Thus, not only do the bending ends 150a pierce the bag-shaped body 140, but also they respectively move left and right when the button 120 is continually pushed, to rip the bag-shaped body 140. This way, the pierced opening in the bag-shaped body 140 becomes bigger, so that the liquid reactant 50 in the bag-shaped body 140 could flow out faster to the containing space 110a, and reduce the possibility of the liquid reactant 50 remaining in the bag-shaped body 140.

Generally, in an embodiment of the invention, the button is configured in the casing and seals the opening of the casing through the method of integral formation. Thus, when the button is pressed and the elastic element is pushed to pierce the bag-shaped body, there will be no interstice between the button and the casing, and the entire structure will have a better airtight quality, improving the generation rate of hydrogen. In addition, the elastic element includes a bending end. When the button is pushed, the bending end pierces the bag-shaped body. After the bending end pierces the bag-shaped body, if the user continues to press the button, the bending end could continue to be pushed to widen the pierced opening, allowing the liquid reactant to flow out faster, preventing the liquid reactant from remaining in the bag-shaped body and lowering the generation of hydrogen.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A hydrogen generating device, adapted for a fuel cell, the hydrogen generating device comprising:
   a casing having a containing space and an opening;
   a button, integrally formed and connected to the casing to seal the opening;
   a solid reactant, disposed in the casing;
   a bag-shaped body, disposed in the casing and containing a liquid reactant; and
   at least a flexible element, connected to the casing and located in the containing space, the flexible element including a bending end, wherein the flexible element is aligned to the button and is located between the button and the bag-shaped body, when the button is pressed, the button pushes the flexible element so the bending end pierces the bag-shaped body, and the liquid reactant flows out and reacts with the solid reactant to generate hydrogen.

2. The hydrogen generating device as claimed in claim 1, wherein the button is a thermoplastic elastomer.

3. The hydrogen generating device as claimed in claim 1, wherein a material of the casing is a high polymer plastic.

4. The hydrogen generating device as claimed in claim 1, wherein the button and the casing are fabricated through a double injection method.

5. The hydrogen generating device as claimed in claim 1, wherein the flexible element is a metallic piece.

6. The hydrogen generating device as claimed in claim 1, wherein the quantity of the flexible elements is two, and the flexible elements respectively extend from two opposite inner walls of the casing.

7. The hydrogen generating device as claimed in claim 1, wherein the bending end includes a sawtooth structure, a pin structure, or a knife structure, when the button is pressed, the button pushes the bending end towards the bag-shaped body to pierce the bag-shaped body.

8. The hydrogen generating device as claimed in claim 1, wherein the casing has an exhaust opening, linked to the containing space.

9. The hydrogen generating device as claimed in claim 1, further comprising an absorbent, enclosing the solid reactant or mixing with the solid reactant.

10. The hydrogen generating device as claimed in claim 1, wherein the solid reactant is solid NaBH4.

11. The hydrogen generating device as claimed in claim 1, wherein the bending end extends in a direction towards the bag-shaped body.

* * * * *